United States Patent

[11] 3,543,938

[72] Inventors Oswald Busse;
Hugo Klesper, Michelbach, Germany
[21] Appl. No. 819,929
[22] Filed April 28, 1969
[45] Patented Dec. 1, 1970
[73] Assignee Passavant Werke
Michelbacher, Hutte, Germany
[32] Priority June 6, 1968
[33] Germany
[31] No. 1,761,556

[54] FILTER PLATE WITH SPACING MEANS
7 Claims, 5 Drawing Figs.
[52] U.S. Cl. .................................................. 210/229,
210/231
[51] Int. Cl. ............................................. B01d 25/12
[50] Field of Search .......................................... 210/227,
229, 231, 486

[56] References Cited
UNITED STATES PATENTS
298,758 5/1884 Johnson ..................... 210/231

| 306,653 | 10/1884 | Smith | 210/231X |
|---|---|---|---|
| 499,515 | 6/1893 | Burke | 210/227X |
| 607,929 | 7/1898 | Hinken | 210/229X |
| 2,761,567 | 9/1956 | Fischer | 210/229X |
| 2,989,187 | 6/1961 | Demeter | 210/227 |

FOREIGN PATENTS

| 878,991 | 10/1961 | Great Britain | 210/231 |
|---|---|---|---|
| 975,662 | 11/1964 | Great Britain | 210/229 |

*Primary Examiner*—Reuben Friedman
*Assistant Examiner*—C. M. Ditlow
*Attorney*—Larson, Taylor & Hinds ABSTRACT: A filter plate for a filter press, the plate including raised parts projecting outwardly from the inner portions of the plate within the bordering frame part and including spacing elements located at the outermost ends of the spacing elements. A filter cloth extends over the inner portion and passes between the spacing elements and the surface of the inner portion. One spacing element may be mounted on each end of a pin extending through the filter plate.

INVENTORS
OSWALD BUSSE
HUGO KLESPER 3,543,938

FILTER PLATE WITH SPACING MEANS

BACKGROUND OF THE INVENTION

This invention relates to filter plates, and in particular it relates to filter plates of the type for use in frame or chamber type filter presses conventionally used, for example, for dewatering sewage sludge.

In filter presses of the present type, unbalanced pressure conditions often exist on opposite sides of a given filter plate. This can cause the plates to bend, thereby damaging the plates. This problem is especially acute for large plates and/or plates placed under high pressure conditions. To avoid this problem, it is known to provide a bracing structure between the filter plates such as raised cams or ribs or the like, protruding from the surface of the central portion of the plates towards the adjacent plates. These known bracing structures have usually been formed as a part of the filter plate itself; and the filter cloth which normally covers the filter plate has then been spread across the said raised structures. However, this arrangement has the disadvantage that the filter cloth must pass over the outermost ends of the raised bracing structure. This caused weakening of the filter cloth. This resulted for at least two reasons. First, it was necessary to stretch the filter cloth in order to pass it over the raised bracing structure. Secondly, considerable friction is generated at the points where the filter cakes pass over the outermost points of the bracing structure as these points are subjected to frictional wear as the finished filter cakes slide downwardly as the plates are separated at the conclusion of the pressing operation.

One solution to this problem has been to provide the bracing structure as a ring extending outwardly adjacent the central opening in the filter plate which is normally provided for introducing influent into the space between the filter plates. However, this arrangement has the disadvantage that it considerably narrows the flow area available for the introduction of influent liquid. This could block the flow of fluid and permit additional pressure differences to exist, thereby further increasing the danger of damage to the filter plates.

Thus, there exists a need for a new and improved means for bracing the filter plates relative to each other during the pressing operation without damaging the filter cloths or without concurrently increasing the risk of danger to the filter plates themselves.

SUMMARY OF THE INVENTION

Thus, a purpose of the present invention is to provide a new and improved filter plate which overcomes disadvantages of filter plates known heretofore.

This purpose is achieved in accordance with the present invention by providing an arrangement whereby the bracing structure comprises separate spaced elements located on and projecting outwardly from the frame elements, whereby the filter cloths extend between these spacing elements and the surface of the filter plate. With this arrangement, it is not necessary to stretch the filter cloth over the spacing elements and it is not necessary to locate portions of the filter cloth at the outermost points of the spacing elements where they would be subjected to frictional forces as discussed above. Further, this arrangement eliminates much of the frictional force that would be applied to the entire area of the filter cloths during the downward sliding movement of the filter cake. With this arrangement, because of the spacing elements, the filter cake does not drop until the plates are moved apart sufficiently for the filter cake to drop beyond the outermost point of the spacing elements. Not only does this reduce wear on the filter cloth, but it renders the operation of removing the filter cake more efficient as it permits a more smooth movement of the filter cake.

According to a preferred embodiment of the present invention, the spacing elements are located at suitable points between the central influent bore of the filter plate and the raised outer frame of the filter plate. This is the thin inner portion of the filter plate where its structural rigidity is minimal and where the need for bracing is greatest.

Preferably, raised bosses are formed on the said inner portion, the outer surface of these bosses being plane and being located only slightly outwardly from the remaining surface of the inner portion. The filter cloth must pass over these plane surfaces and the spacing elements are positioned on the outside of the filter cloth and include means passing through the filter cloth and connected to the boss. Thus, since the filter cloth must pass over these bosses, it is preferable to keep their height to a minimum.

In a preferred arrangement of the present invention alined bosses are provided on opposite sides of the inner portion of the filter plate and an aperture is formed through the said inner portion of the filter plate passing through both of the alined bosses. A cylindrical pin, which may be hollow to permit fluid flow across the inner portion, is then placed through the aperture and through the filter cloths, and spacing elements are then attached to both ends of this pin.

For purposes of definition, the plane passing through the center of the filter plate and parallel to the large generally flat sides of the filter plate will be referred to hereinafter as the center plane. In plate filters of this type, the outer frame generally extends outwardly from the center plane an amount greater than the inner portion. With this arrangement, contact between adjacent plates is made at the outer frames while the spaces between the reduced inner portions form the chambers in which the influent liquid is received.

In a preferred arrangement of the invention the height of the spacing elements from the center plane should be no greater than the height of the outer frame structure from the center plane so that in the rest or unloaded condition of the filter press, with the filter plates in contact with each other, a distance of 0.1 to 0.5 mm. is provided. Preferably, this clearance is 0.1 to 0.3 mm. Preferably, all of the elements should be of the same height with a tolerance of up to 0.3 mm., but preferably up to 0.2 mm. This permits sufficient engagement of the outer frame member while it does not cause too high a surface pressure to be exerted on the portion of the filter cloth located between the spacing elements and the raised bosses during the pressing operation.

In accordance with another feature of the present invention the face of the spacing elements facing the filter cloth are preferably larger than the outermost end of the spacing elements. For example, the spacing elements may be in the shape of a truncated cone. This arrangement also provides a more rapid and uniform removal of the filter cake from the filter cloth. Also, the larger area against the cloth reduces the pressure against the filter cloth.

Thus, it is a purpose of this invention to provide a new and improved filter plate which overcomes disadvantages of previously known filter plates.

It is another object of this invention to provide a new and improved filter plate, in a filter press of the type described, wherein wear upon the filter cloth is substantially reduced.

It is another object of this invention to provide a filter plate for a filter press of the type described, having spacing elements projecting outwardly from the inner portion of the plate and wherein the filter cloth is positioned between the spacing elements and the surface of the filter plate.

It is another object of this invention to provide a new and improved arrangement for mounting spacing elements on a filter plate for use in a filter press of the type described.

Other objects and the intended advantages of the present invention will become apparent from the detailed description to follow together with the accompanying drawings.

BRIEF SUMMARY OF THE DRAWINGS

There follows a detailed description of a preferred embodiment of the invention together with accompanying drawings. However, it is to be understood that the detailed description and the drawings are provided for purposes of illustration and that modification and variations are apparent to those skilled in the art without departing from the spirit and scope of the invention.

DETAILED DESCRIPTION OF THE PREFERRED EMBODIMENT

Figure 5:
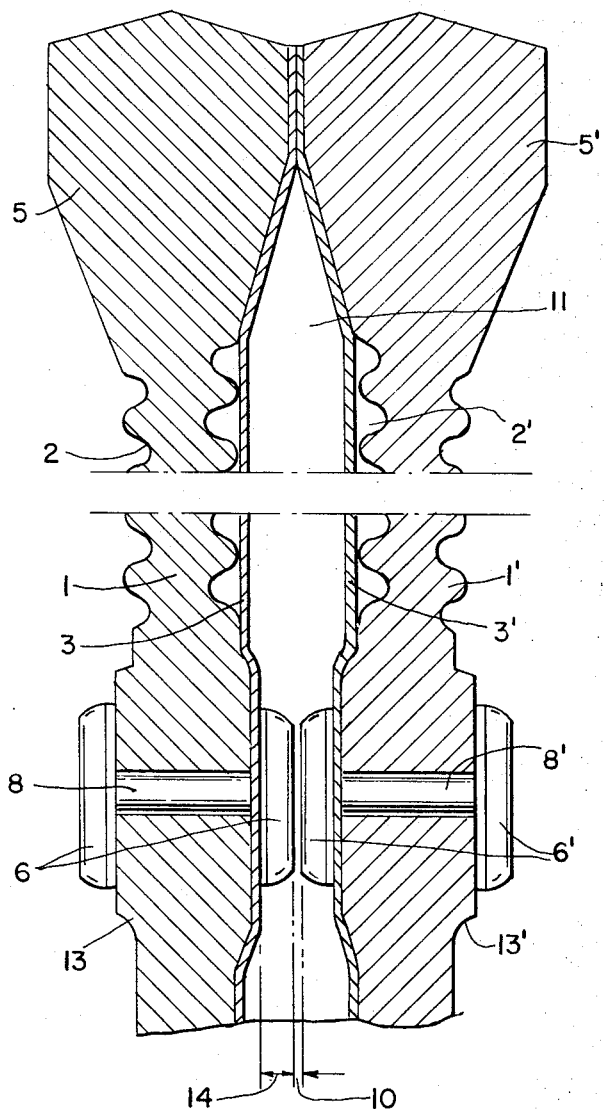
FIG. 5 is a horizontal sectional view taken along line B–B of FIG. 2 and including, in addition, an adjacent filter plate.

Like numerals are used to represent like elements throughout; and in FIG. 5 the same numerals include a prime (') to indicate similar elements on an adjacent filter plate.

Figure 1:
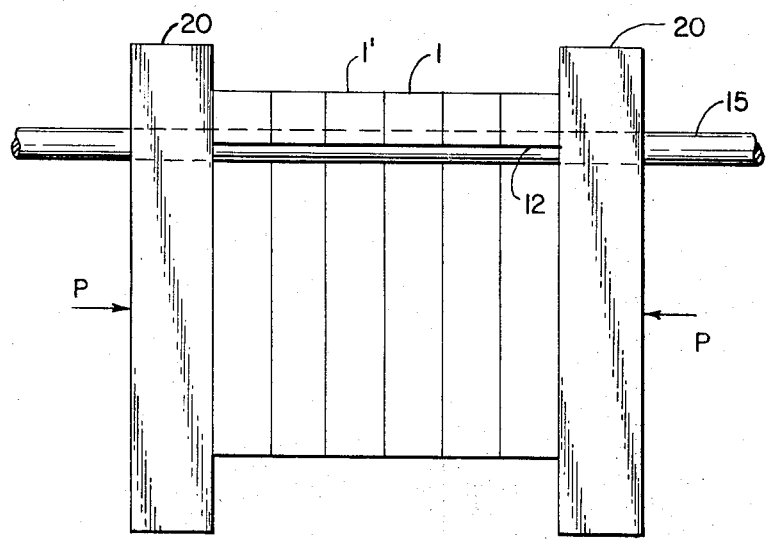
FIG. 1 is a highly schematic view of a filter press of the type in which a filter plate of the present invention would be used.

FIG. 1 illustrates, schematically, a filter press of the type in which the filter plate of the present invention would be used. A plurality of such plates 1 are positioned with their large faces towards each other. The plates are supported on suitable means such as support rods 15. For example, the support rods 15 may comprise a pair of parallel poles onto which the slots 12A (see FIG. 2) are mounted. A force P would then be applied to end structures 20 for forcing the filter plates 1 together.

Referring now to FIGS. 2 through 5, the filter plate 1 includes a raised outer frame 5 which extends about the periphery of the filter plate. When the plates are mounted on the filter press, it is these raised outer frames which engage the raised outer frames of adjacent filter plates through which most of the pressing force is transmitted. Thus, it can be seen that if pressure differential forces across a filter plate cause that filter plate to be misaligned, relative to the adjacent filter plates, it is likely that the outer frame 5 could be bent, and this would of course render the filter plate inoperable.

Figure 2:
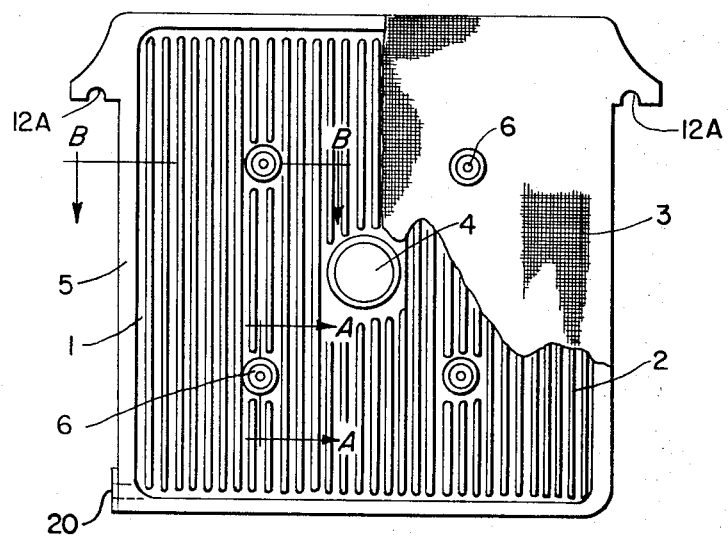
FIG. 2 is a front elevational view of a filter plate constructed in accordance with the present invention.
Figure 3:
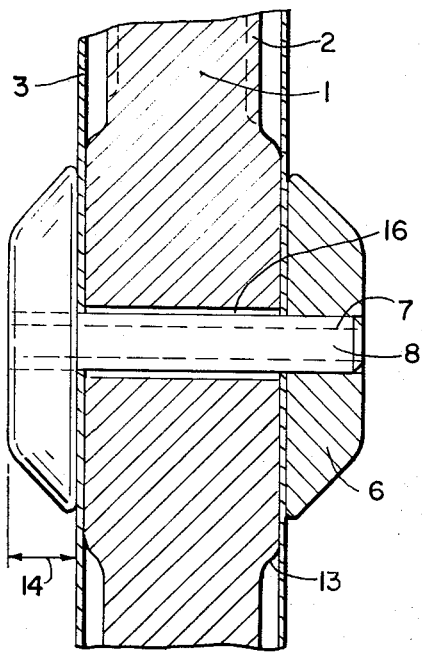
FIG. 3 is a vertical sectional view taken along line A–A of FIG. 2.

Over their large, generally flat surfaces the filter plates include filter cloths 3, who shown in the upper right hand portion of FIG. 2, and shown also in FIGS. 3 and 5, through which the filter liquid passes. The surface of the filter plate includes a plurality of downwardly extending grooves 2 for drainage of the filtered liquid which liquid is then discharged from the space between the filter plate through opening 20 in the frame 5 as shown in FIG. 2.

As best shown in FIG. 5, a chamber 11 is formed between two adjacent filter plates. Influent liquid is introduced to this chamber, through a central bore 4 which is visible in FIG. 2.

Figure 4:
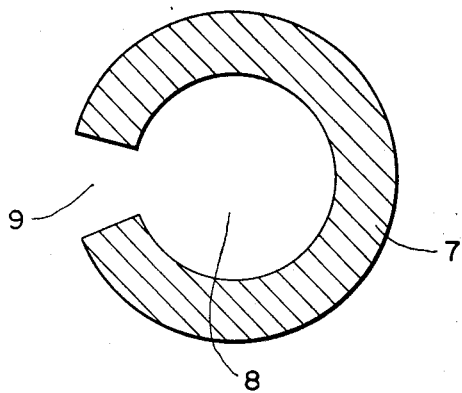
FIG. 4 is a sectional view taken through an element of FIG. 3.

In accordance with a main feature of the present invention, the filter plates are provided with a plurality of spacing elements 6. For this purpose the filter plates are provided with raised bosses 13 formed on the surface of the filter plate. Preferably, the outer surfaces of these bosses are plane since this will minimize wear upon the filter cloths which pass thereover. A bore 16 passes through the filter plate 1 at the bosses 13. A pin 7 is then passed through this bore 16 and also through alined apertures formed in the filter cloths 3. As illustrated in FIG. 4, the element 7 may be a hollow elongated split ring with outward resilience so that when the ring is placed in the bore 16 it expands outwardly, whereby it is held tightly in the bore 16. The elongated slot 9 is shown in FIG. 4. The spacing elements 6 may then be attached to either end of the pin 7 by any suitable means such as screw threads, spring and groove, etc. Further, in a preferred arrangement of the present invention, the pin 7 will be hollow and include a bore 8 which passes completely through the pin thereby placing the two sides of the filter plate 1 into fluid communication with each other. This has the advantage of providing additional passages for equalizing the fluid pressure on either side of the filter plate 1.

As noted above, the filter cloths 3 should be stretched as little as possible. Consequently, it is preferable to maintain the height of bosses 13 as low as possible to avoid this stretching of the filter cloths 3. Also, the raised bosses 13 are formed with generally flat planar surfaces for receiving the filter cloths in a smooth manner. The elements 6 preferably have a larger area on their internal sides than on their external side sides so that a greater area is provided for distributing the force over the portion of the filter cloth between the spacing elements 6 and the plane raised surface of the boss 13. In a preferred embodiment of the invention the spacing elements are in the shape of a truncated cone with the larger side against the filter cloth 3.

As illustrated in FIG. 5, the height 14 of the spacing elements 6 should be lower than the height of the frame members 5 so that in the contacting but unloaded position of adjacent filter plates a space 10 remains between the spacing elements 6 and 6'. Consequently, the elements 6 and 6' will not contact each other until a pressure differential force comes into existence during the pressing operation. Preferably, the space 10 should be between 0.1 and 0.5 mm., and in particular, between 0.1 and 0.3 mm. Further, all of them the spacing elements on a given surface should be of substantially the same height with a tolerance of up to 0.3 mm. but preferably 0.2 mm.

Although the invention has been described in considerable detail with respect to a preferred embodiment thereof, it will apparent that the invention is capable of numerous modifications and variations apparent to those skilled in the art.

We claim:

1. A filter plate for use in a filter press of the type wherein a plurality of plates are pressed together, said filter plate comprising a frame extending about the periphery of the plate, the inner portion of the plate within the frame being thinner than the frame, such that in use on a press the frame abuts the frame of a similar adjacent plate such that the space between the two inner portions of the two adjacent plates forms a filter chamber, an influent inlet opening in said inner portion for introducing influent liquid to the said filter chamber, a means for discharging filtered liquid to the said filter chamber, a means for discharging filtered liquid from the filter chamber formed between two adjacent plates, said filter plate having slightly raised, generally flat bosses formed on each opposite side of said inner portion in alinement with each other and at a location between and spaced from both the influent inlet opening and the said frame, a passage through the said inner portion extending from the surface of one generally flat boss to the surface of the other said generally flat boss which is alined therewith, a filter cloth extending over the surface of each side of said inner portion and lying flat against the raised surfaces of said bosses, a hollow pin passing through said passage and through said filter cloths, a spacing element on each side of said inner portion, said spacing element including a generally flat surface facing the filter plate, the height of each spacing element above the center plane being less than the height of the frame above the center plane, and means for attaching the spacing elements to the said pin such that the cloth on each side of the plate is pressed and thus held between the raised bosses and the spacing elements and such that the two sides of a filter plate may be placed in fluid communication with each other through said passage and through said pin.

2. A filter plate according to claim 1 wherein said pin is in the form of an outwardly expanding, elongated split ring, whereby the outward resilience of the pin holds it against the said aperture.

3. A filter plate according to claim 1 wherein the height of each spacing element above the center plane of the plate is approximately .05mm. to .25mm. less than the height of the frame from the said center plane, whereby in the rest position, alined spacing elements of two adjacent contacting plates will be separated by approximately 0.1 to 0.5 mm.

4. A filter plate according to claim 3 wherein each side of the inner portion includes a plurality of spacing elements, the height of all said spacing elements from said center plane being substantially equal to each other and within a tolerance of plus or minus 0.2 mm.

5. A filter plate according to claim 1 wherein the area of the side of the spacing element against the filter cloth is larger than the area of the outermost end of the spacing element.

6. A filter plate according to claim 5 wherein the spacing element is in the form of a truncated cone.

7. A filter press comprising end plates, a plurality of filter plates mounted adjacent each other between said end plates to be pressed together when the end plates are moved towards each other, each said plate constructed according to claim 1.